(12) United States Patent
Yasuhara

(10) Patent No.: US 9,738,237 B2
(45) Date of Patent: Aug. 22, 2017

(54) IN-VEHICLE DEVICE COVERING STRUCTURE

(71) Applicant: SUZUKI MOTOR CORPORATION, Hamamatsu (JP)

(72) Inventor: Ryotaro Yasuhara, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 15/152,558

(22) Filed: May 12, 2016

(65) Prior Publication Data
US 2016/0332584 A1 Nov. 17, 2016

(30) Foreign Application Priority Data

May 14, 2015 (JP) .................. 2015-099339

(51) Int. Cl.
| | | |
|---|---|---|
| *B60R 11/04* | (2006.01) | |
| *B60R 13/02* | (2006.01) | |
| *B60R 11/00* | (2006.01) | |
| *B60R 1/12* | (2006.01) | |

(52) U.S. Cl.
CPC .............. *B60R 11/04* (2013.01); *B60R 13/02* (2013.01); *B60R 2001/1253* (2013.01); *B60R 2011/0028* (2013.01)

(58) Field of Classification Search
CPC .. B60R 1/10; B60R 1/12; B60R 11/04; B60R 13/02
USPC .............................. 296/1.07, 1.08, 1.11, 37.7
See application file for complete search history.

(56) References Cited

U.S. PATENT DOCUMENTS

| | | | | |
|---|---|---|---|---|
| 6,811,330 B1* | 11/2004 | Tozawa | ................... | B60R 11/04 224/321 |
| 7,111,996 B2* | 9/2006 | Seger | ................. | H04N 13/0239 348/148 |
| 2005/0001901 A1* | 1/2005 | Eggers | .................... | B60R 11/04 348/118 |
| 2007/0051545 A1* | 3/2007 | Yang | ....................... | B60R 11/04 180/89.1 |
| 2012/0013741 A1* | 1/2012 | Blake, III | ............... | B60R 11/00 348/148 |
| 2015/0251605 A1* | 9/2015 | Uken | ................... | H04N 5/2257 248/467 |

(Continued)

FOREIGN PATENT DOCUMENTS

JP   3148749   3/2001

*Primary Examiner* — Jason S Daniels
(74) *Attorney, Agent, or Firm* — Silicon Valley Patent Group LLP

(57) ABSTRACT

An in-vehicle device covering structure comprises an in-vehicle device attached to a ceiling surface of a vehicle, a cover that covers the in-vehicle device from below, and a plate-shaped bracket attached to the ceiling surface and covered by the cover from below together with the in-vehicle device, the cover hanging from the bracket. The bracket has a first attachment surface attached to the ceiling surface on the vehicle rear side relative to the in-vehicle device, a second attachment surface attached to the cover and arranged overlapping at least a chassis of the in-vehicle device when viewed in a vehicle upper-lower direction and at a distance from the in-vehicle device, and a vertical wall connecting the first and second attachment surfaces, the vertical wall being arranged on the vehicle rear side relative to the in-vehicle device and at a distance from the in-vehicle device.

8 Claims, 6 Drawing Sheets

(56) References Cited

U.S. PATENT DOCUMENTS

| | | | |
|---|---|---|---|
| 2016/0009230 A1* | 1/2016 | Miyado | B60R 11/04 |
| | | | 224/482 |
| 2016/0129839 A1* | 5/2016 | Kim | H04N 5/2254 |
| | | | 348/148 |
| 2016/0185296 A1* | 6/2016 | Lee | G07C 5/0866 |
| | | | 348/148 |
| 2016/0227079 A1* | 8/2016 | Oh | H04N 7/18 |

* cited by examiner

ARROW VIEW A

ARROW VIEW B

C-C

D-D

IN-VEHICLE DEVICE COVERING STRUCTURE

CROSS-REFERENCE TO RELATED APPLICATION

This application is based upon and claims the benefit of priority from the prior Japanese Patent Application No. 2015-099339, filed on May 14, 2015, the entire contents of which are incorporated herein by reference.

FIELD

The present invention relates to an in-vehicle device covering structure with which an in-vehicle device attached to a ceiling surface of a vehicle interior near a windshield glass of a vehicle is covered from below.

BACKGROUND

In vehicles such as automobiles, there are cases where an in-vehicle device is attached to the ceiling surface of the vehicle interior. An in-vehicle camera or the like is a known example of the in-vehicle device, and is attached to the ceiling surface near the windshield glass so as to capture images forward of the vehicle while the vehicle is moving.

Japanese Patent No. 3148749 discloses a covering structure including a camera, a chassis, and a cover. The chassis is a member having a predetermined length in a vehicle width direction. The chassis supports the camera and is fixed to a vehicle body. The cover is a member formed of a highly shock-resistant material such as polycarbonate. The cover covers the camera and the chassis from below in a state in which a sufficient crash clearance is left between the cover and the camera. Japanese Patent No. 3148749 states that the use of such a cover can improve safety in the event of a crash.

Incidentally, if a rear-view mirror is installed on a vehicle rear side relative to the in-vehicle device such as a camera covered by the cover, there are cases where a passenger accidentally touches the cover with a hand when adjusting the mirror, and a load is thus applied to the cover from the rear side. Moreover, if an article such as a surfboard is carried in the vehicle interior, and the article comes into contact with the cover, a load from below is applied to the cover. If a shock from the vehicle rear side or a vehicle lower side is applied to the cover as described above, the load is transferred from the cover to the camera, and thus the camera needs to be protected.

However, the covering structure in Japanese Patent No. 3148749 merely protects the passenger in the event of a crash by providing the crash clearance and suppresses excessive deformation of the cover in the event of a crash by forming the cover of a highly shock-resistant material, and protection of the camera is not taken into account.

The present invention was made in view of such problems, and it is an object thereof to provide an in-vehicle device covering structure that can protect an in-vehicle device without any load being directly transferred to the in-vehicle device even if a load from the vehicle rear side or the vehicle lower side is applied to a cover.

SUMMARY OF THE DISCLOSURE

In order to solve the foregoing problems, a representative configuration of an in-vehicle device covering structure according to the present invention is an in-vehicle device covering structure including an in-vehicle device attached to a ceiling surface of a vehicle interior near a windshield glass of a vehicle, a cover that covers the in-vehicle device from below, and a plate-shaped bracket attached to the ceiling surface and covered by the cover from below together with the in-vehicle device, the cover hanging from the bracket, wherein the bracket has a first attachment surface attached to the ceiling surface on a vehicle rear side relative to the in-vehicle device, a second attachment surface attached to the cover, the second attachment surface being arranged overlapping at least a portion of the in-vehicle device when viewed in a vehicle upper-lower direction and at a distance from the in-vehicle device, and a vertical wall connecting the first attachment surface and the second attachment surface, the vertical wall being arranged on the vehicle rear side relative to the in-vehicle device and at a distance from the in-vehicle device.

Here, the in-vehicle device is mounted on the ceiling surface of the vehicle interior near the windshield glass. Thus, there are cases where a load is applied to the cover, which covers the in-vehicle device from below, from the vehicle rear side or the vehicle lower side. With the above-described configuration, in a state in which the bracket is attached to the ceiling surface via the first attachment surface with the cover hanging from the bracket, the vertical wall of the bracket is spaced apart from the in-vehicle device toward the vehicle rear side, and the second attachment surface of the bracket is spaced apart from at least a portion of the in-vehicle device when viewed in the vehicle upper-lower direction. Thus, if a load from the vehicle rear side or the vehicle lower side is applied to the cover, the load is received by the vertical wall or the second attachment surface of the bracket and transferred to the ceiling surface via the first attachment surface. Therefore, even if a load from the vehicle rear side or the vehicle lower side is applied to the cover, the load is not directly transferred to the in-vehicle device, and thus the in-vehicle device can be protected.

It is preferable that a rear portion of the in-vehicle device is recessed upward and forms a space, and the second attachment surface of the bracket overlaps the space when viewed from a vehicle lateral side. With this configuration, the distance that is set between the in-vehicle device and the second attachment surface of the bracket is within the range of the above-described space. Therefore, it is not necessary to provide this distance under the in-vehicle device, and thus, the cover can be located directly under the in-vehicle device, and thus the vehicle interior space is not reduced.

It is preferable that both ends of the second attachment surface of the bracket in a vehicle width direction are located inward, with respect to the vehicle width direction, of both ends of the in-vehicle device in the vehicle width direction. That is to say, when viewed in the vehicle upper-lower direction, the two ends of the second attachment surface in the vehicle width direction do not protrude outward with respect to the vehicle width direction from the respective ends of the in-vehicle device in the vehicle width direction. Accordingly, the second attachment surface of the bracket fits within the width of the in-vehicle device in the vehicle width direction. Therefore, the size of the cover is reduced, and thus the vehicle interior space is not reduced.

It is preferable that the cover is attached to the first attachment surface of the bracket. With this configuration, the cover is attached to not only the second attachment surface of the bracket but also the first attachment surface attached to the ceiling surface of the vehicle interior and having high rigidity. Since the first attachment surface is attached to the ceiling surface on the vehicle rear side relative to the in-vehicle device, the first attachment surface receives a load that is applied to the cover from the vehicle rear side. Accordingly, even if a load is applied to the cover from not only the vehicle lower side but also the vehicle rear side, the bracket is more unlikely to bend, and thus the in-vehicle device can be protected.

With the present invention, it is possible to provide an in-vehicle device covering structure that can protect an in-vehicle device without any load being directly transferred to the in-vehicle device even if a load from the vehicle rear side or the vehicle lower side is applied to a cover.

DETAILED DESCRIPTION

Figure 1:
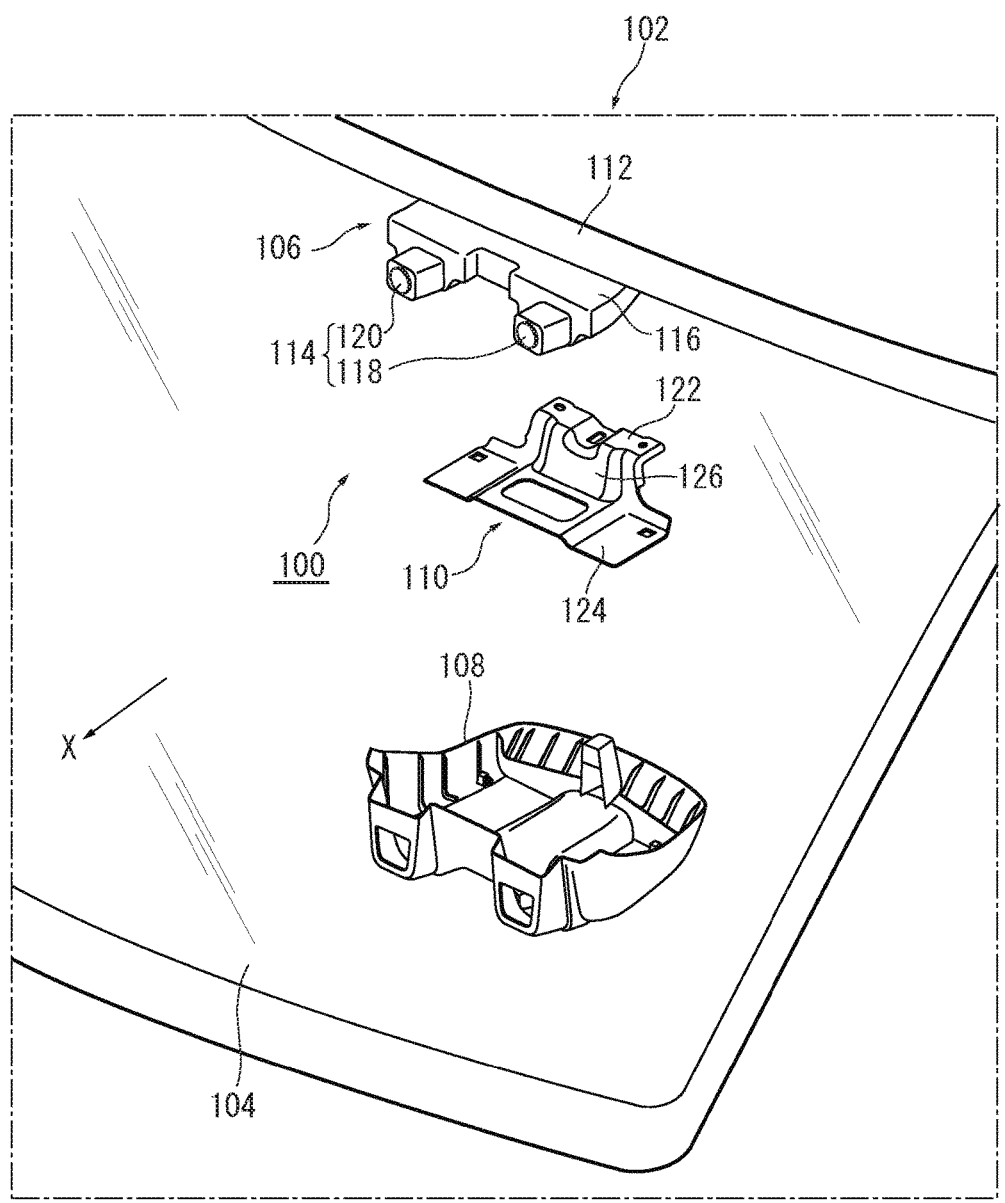
FIG. 1 is an exploded perspective view of an in-vehicle device covering structure according to an embodiment of the invention.

Hereinafter, a preferred embodiment of the present invention will be described in detail with reference to the accompanying drawings. The dimensions, materials, and other specific numerical values described in this embodiment are merely examples for facilitating the understanding of the present invention, and are not to be construed as limiting the invention unless otherwise stated. It should be noted that elements constituting substantially identical functions and configurations are denoted by identical reference numerals in the present specification and the drawings, and hence redundant description has been omitted. Also, illustration of elements that are not directly relevant to the present invention has been omitted.

Figure 2:
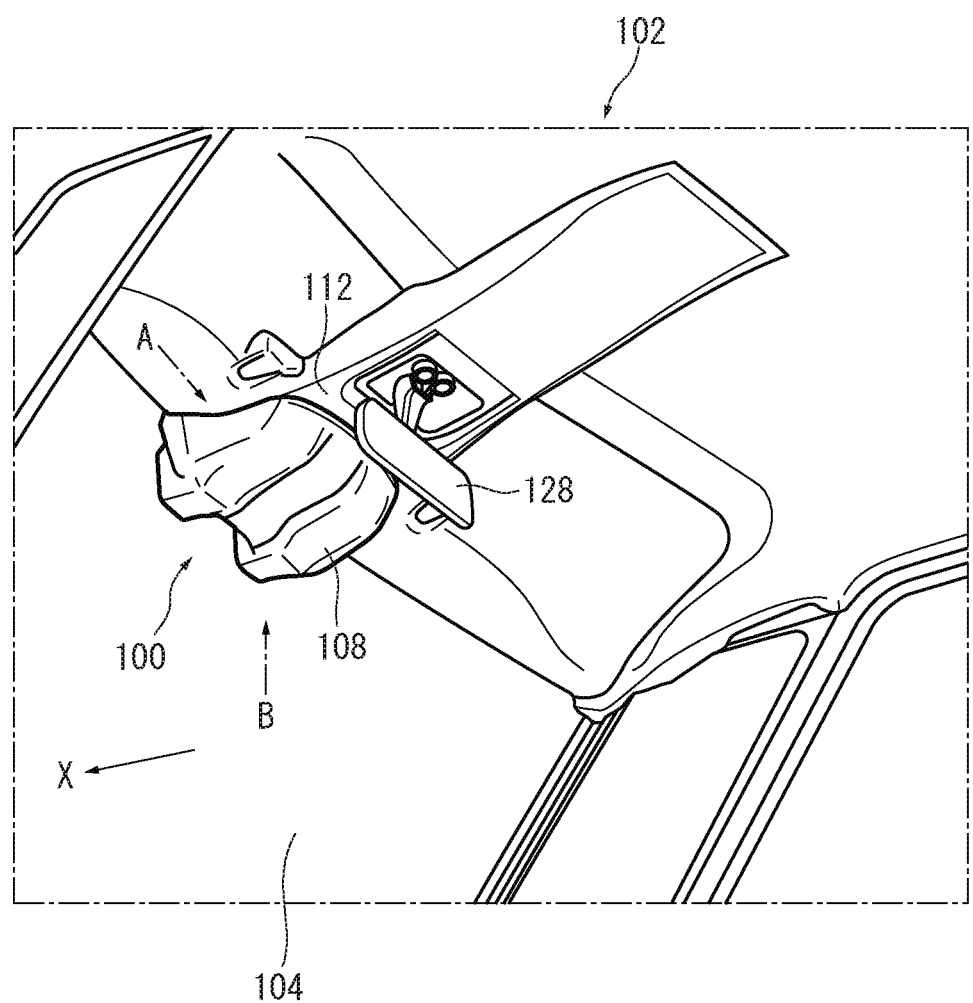
FIG. 2 shows the in-vehicle device covering structure in FIG. 1 when viewed from inside a vehicle interior.

FIG. 1 is an exploded perspective view of an in-vehicle device covering structure 100 according to an embodiment of the invention. FIG. 1 shows the in-vehicle device covering structure 100 when viewed from a vehicle exterior side through a windshield glass 104 of a vehicle 102. FIG. 2 shows the in-vehicle device covering structure 100 in FIG. 1 when viewed from inside a vehicle interior. Hereinafter, arrow X in the drawings indicates a vehicle front side.

As shown in FIG. 1, the in-vehicle device covering structure 100 includes an in-vehicle device 106, a cover 108 that covers the in-vehicle device 106 from below, and a plate-shaped bracket 110. The in-vehicle device 106 is attached to a ceiling surface 112 of the vehicle interior near the windshield glass 104 of the vehicle 102 and includes a camera unit 114 and a chassis 116. The camera unit 114 is a stereo camera constituted by a pair of left and right cameras 118 and 120. The chassis 116 has a predetermined length in a vehicle width direction and is fixed to the ceiling surface 112 while supporting the cameras 118 and 120.

The bracket 110 is made of a highly shock-resistant material, for example a metal, and has a first attachment surface 122 attached to at least the ceiling surface 112, a second attachment surface 124 attached to the cover 108, and a vertical wall 126 connecting the first attachment surface 122 and the second attachment surface 124. As shown in FIG. 2, the bracket 110 is covered by the cover 108 from below together with the in-vehicle device 106.

The in-vehicle device covering structure 100 is arranged near the windshield glass 104 so that images forward of the vehicle are captured by the cameras 118 and 120 while the vehicle is moving, for example. As shown in FIG. 2, in the vehicle 102, a rear-view mirror 128 is installed on the vehicle rear side relative to the in-vehicle device covering structure 100. If a passenger accidentally touches the cover 108 with a hand when adjusting the rear-view mirror 128, a load is applied to the cover 108 from the vehicle rear side. Moreover, for example, if an article such as a surfboard is carried in the vehicle interior, and the article comes into contact with the cover 108, a load is applied to the cover 108 from the vehicle lower side. In the present embodiment, a situation in which a shock is applied to the cover 108 from the vehicle rear side or the vehicle lower side is assumed, and a configuration that protects the in-vehicle device 106 from such shock is employed.

Figure 3A:
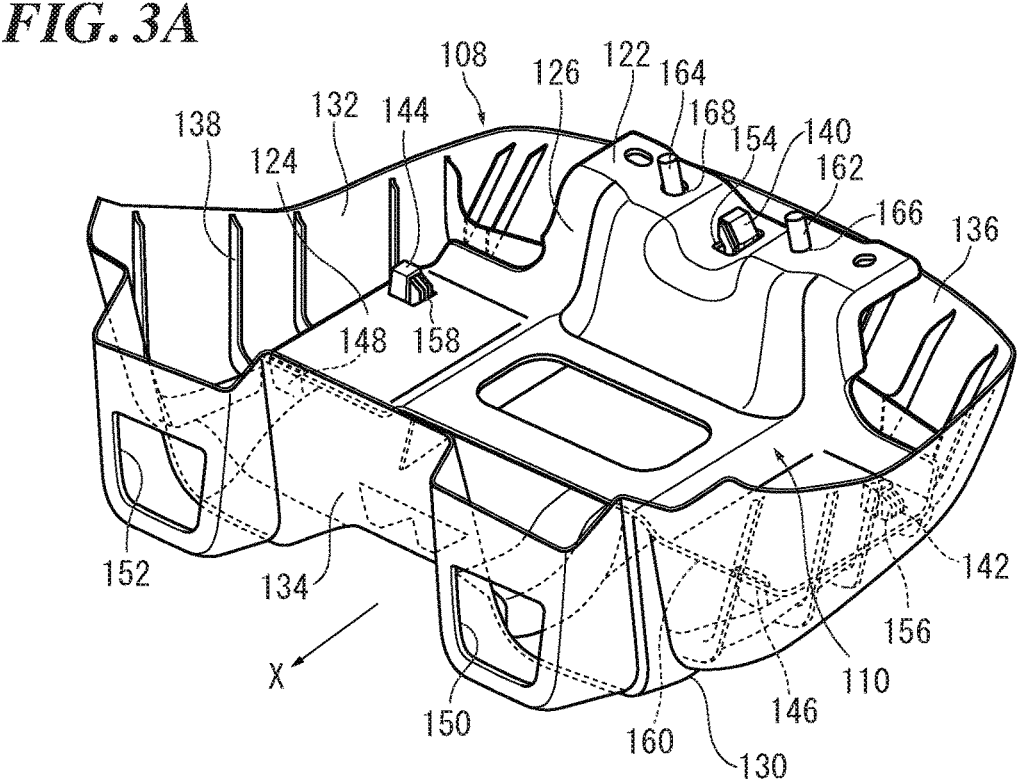
FIGS. 3A and 3B show a cover and a bracket of the in-vehicle device covering structure in FIG. 1.
Figure 3B:
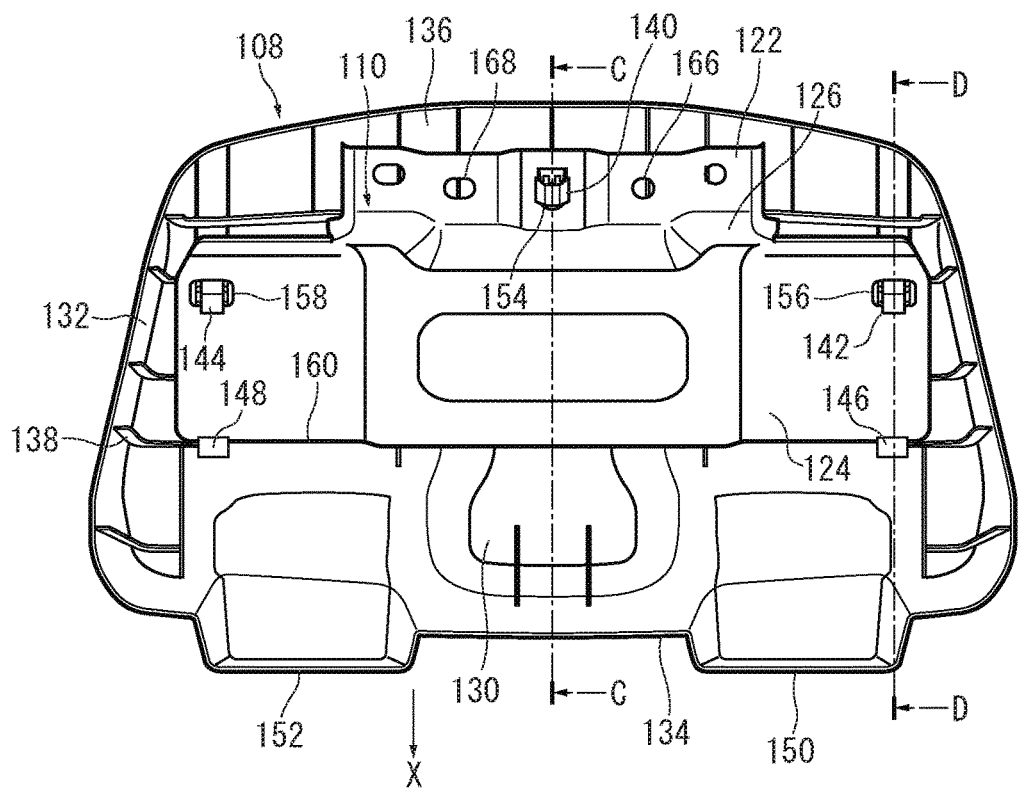

FIGS. 3A and 3B show the cover 108 and the bracket 110 of the in-vehicle device covering structure 100 in FIG. 1. FIG. 3A is a perspective view showing a state in which the bracket 110 is covered by the cover 108 from below. FIG. 3B is a top view of the cover 108 and the bracket 110 in FIG. 3A.

The cover 108 is made of a resin. The cover 108 has a bottom surface 130 as well as a side surface 132, a front surface 134, and a rear surface 136 extending upward from the bottom surface 130, and has a shape that covers the bracket 110 from below. Moreover, the cover 108 has ribs 138 integrally formed so as to extend from the bottom surface 130 to the side surface 132 and the rear surface 136, a claw portion 140 engaging the first attachment surface 122 of the bracket 110, as well as four claw portions 142, 144, 146, and 148 engaging the second attachment surface 124 of the bracket 110. Openings 150 and 152 corresponding to the positions of the cameras 118 and 120 are provided in the front surface 134 of the cover 108. Moreover, the bracket 110 has hole portions 154, 156, and 158 engaging the claw portions 140, 142, and 144, respectively, of the cover 108.

With respect to the bracket 110, the claw portions 140, 142, and 144 of the cover 108 respectively engage the hole portion 154 of the first attachment surface 122 and the hole portions 156 and 158 of the second attachment surface 124, and a front edge 160 of the second attachment surface 124 engages the claw portions 146 and 148. Thus, the cover 108 hangs from the bracket 110. As shown in FIG. 3A, the first attachment surface 122 is attached to the ceiling surface 112 by fastening members 162 and 164 such as clips or bolts being passed through hole portions 166 and 168 from the vehicle lower side. In this manner, the first attachment surface 122 is attached to the ceiling surface 112 of the vehicle interior and thus has increased rigidity.

That is to say, the cover 108 is attached to not only the second attachment surface 124 of the bracket 110 but also the first attachment surface 122, which is attached to the ceiling surface 112 and has high rigidity.

Figure 4:
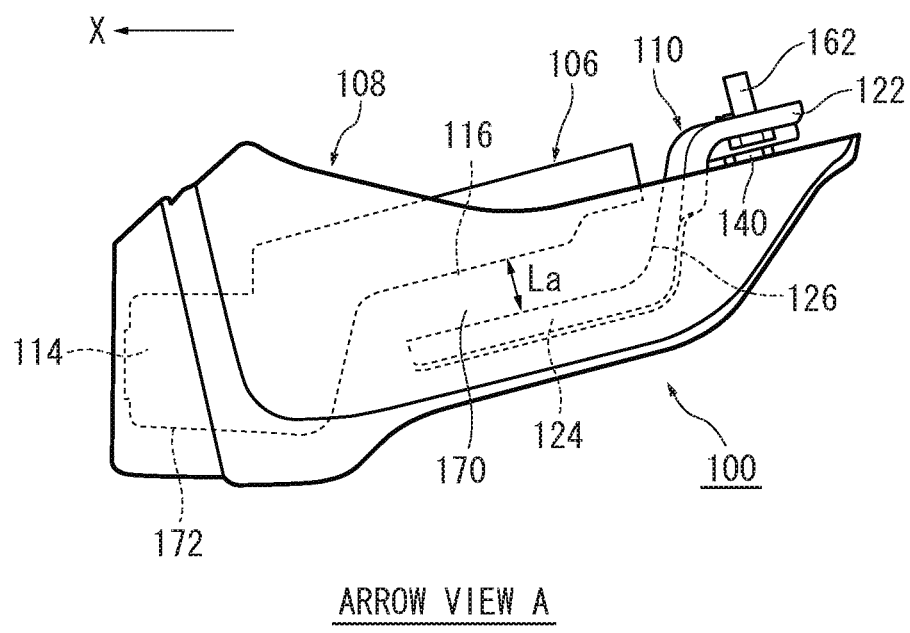
FIG. 4 shows the in-vehicle device covering structure in FIG. 2 when viewed in the direction of arrow A.

FIG. 4 shows the in-vehicle device covering structure 100 in FIG. 2 when viewed in the direction of arrow A. In FIG. 4, the positional relationship between the in-vehicle device 106 and the bracket 110 is schematically shown, and the ceiling surface 112 and the like are omitted. The first attachment surface 122 of the bracket 110 is attached to the ceiling surface 112 on the vehicle rear side relative to the in-vehicle device 106 using the fastening member 162. The vertical wall 126 of the bracket 110 is arranged on the vehicle rear side relative to the in-vehicle device 106 with a certain distance provided therebetween.

With respect to the in-vehicle device 106, the chassis 116 that is located to the rear of the camera unit 114 is recessed upward, thereby forming a space 170. The second attachment surface 124 of the bracket 110 overlaps the space 170 as shown in FIG. 4 when viewed from a vehicle lateral side, and furthermore is located on a vehicle upper side relative to a lower end 172 of the camera unit 114 of the in-vehicle device 106. Moreover, the second attachment surface 124 overlaps the chassis 116 at a distance La from the chassis 116 in a vehicle upper-lower direction. The distance La here is set as appropriate using the space 170 that is formed under the chassis 116. Thus, in a state in which the first attachment surface 122 of the bracket 110 is attached to the ceiling surface 112 with the cover 108 hanging from the bracket 110, the vertical wall 126 of the bracket 110 is spaced apart from the in-vehicle device 106 toward the vehicle rear side, and the second attachment surface 124 of the bracket 110 is spaced apart from the chassis 116 of the in-vehicle device 106 when viewed from the vehicle lateral side.

Figure 5:
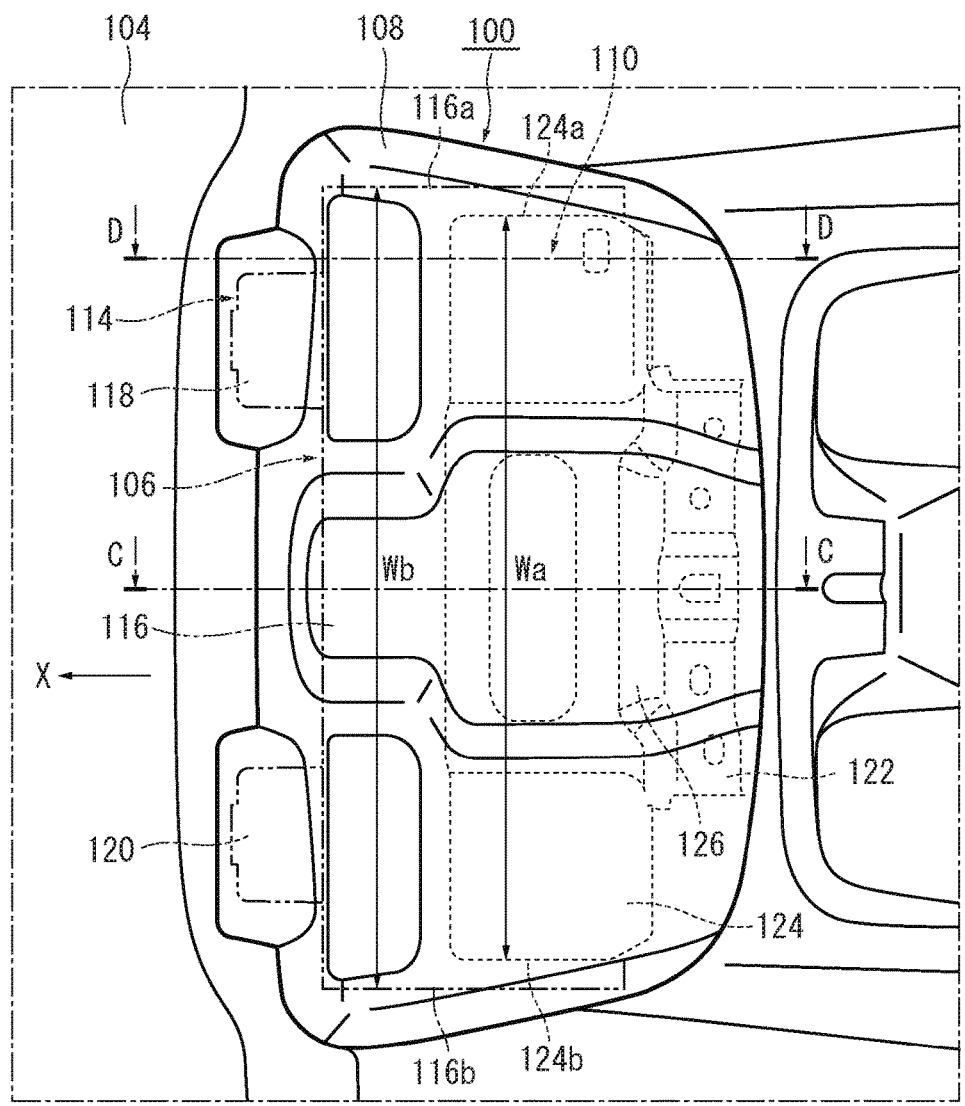
FIG. 5 shows the in-vehicle device covering structure in FIG. 2 when viewed in the direction of arrow B.
Figure 6A:
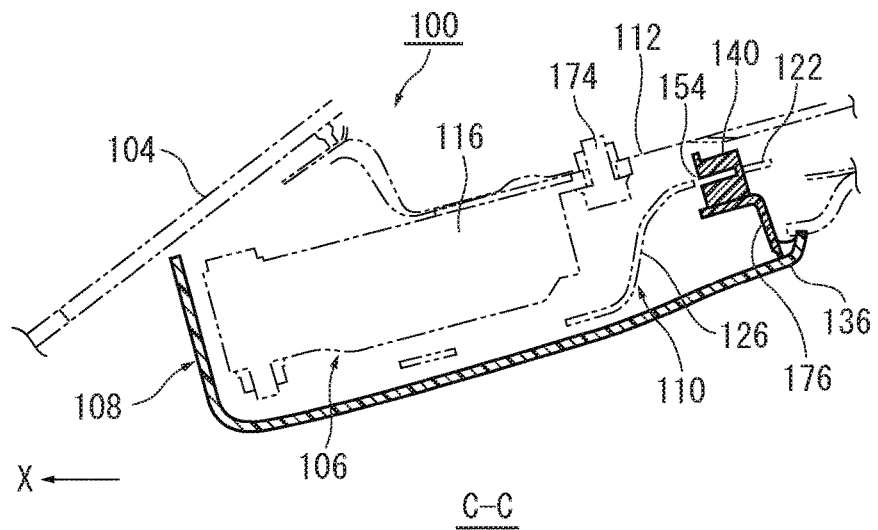
FIGS. 6A and 6B are cross-sectional views of the in-vehicle device covering structure in FIG. 5.
Figure 6B:
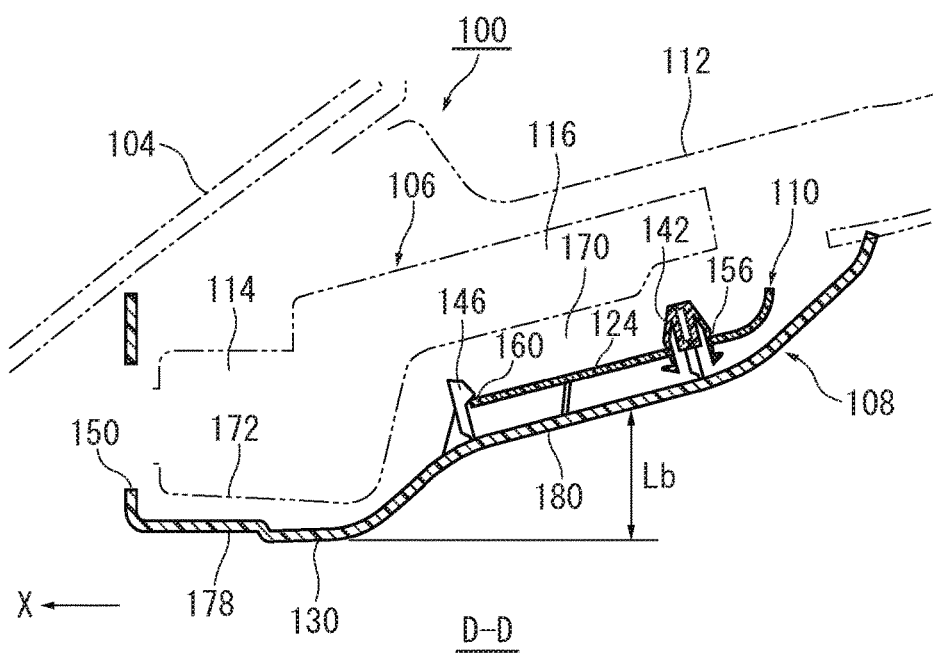

FIG. 5 shows the in-vehicle device covering structure 100 in FIG. 2 when viewed in the direction of arrow B. FIGS. 6A and 6B are cross-sectional views of the in-vehicle device covering structure 100 in FIG. 5. FIGS. 6A and 6B show a C-C cross section and a D-D cross section, respectively, of the in-vehicle device covering structure 100 in FIG. 5. It should be noted that lines C-C and D-D are also shown in FIG. 3B.

As shown in FIG. 5, both ends 124a and 124b of the second attachment surface 124 of the bracket 110 in the vehicle width direction are located inward, with respect to the vehicle width direction, of both ends 116a and 116b of the chassis 116 of the in-vehicle device 106 in the vehicle width direction. That is to say, a width dimension Wa of the second attachment surface 124 in the vehicle width direction is shorter than a width dimension Wb of the chassis 116 in the vehicle width direction. Accordingly, when viewed in the vehicle upper-lower direction, the two ends 124a and 124b of the second attachment surface 124 in the vehicle width direction do not protrude outward with respect to the vehicle width direction from the respective ends 116a and 116b of the chassis 116 in the vehicle width direction, and the second attachment surface 124 fits within the width of the in-vehicle device 106 in the vehicle width direction.

The chassis 116 of the in-vehicle device 106 is fixed to the ceiling surface 112 using a fastening member 174 shown in FIG. 6A. The claw portion 140 of the cover 108 is formed on a pedestal 176 that is provided upright on the rear surface 136, for example, and the claw portion 140 engages the hole portion 154 of the first attachment surface 122 of the bracket 110. In this manner, the cover 108 is attached to the first attachment surface 122. Moreover, as described above, the first attachment surface 122 and the vertical wall 126 of the bracket 110 are spaced apart from the chassis 116 toward the vehicle rear side.

Furthermore, as shown in FIG. 6B, the second attachment surface 124 of the bracket 110 is attached to the cover 108 using the claw portions 142 and 146 in a state in which the second attachment surface 124 is arranged in the space 170, which is formed under the chassis 116, and spaced apart from the chassis 116 toward the vehicle lower side. Also, the space 170 is located at a position on the vehicle rear side relative to the camera unit 114 and the vehicle upper side relative to the lower end 172 of the camera unit 114. As a result, a first portion 178 of the bottom surface 130 of the cover 108, the first portion 178 overlapping the camera unit 114 in the vehicle upper-lower direction, can be located directly under the camera unit 114 without the bracket 110 interposed therebetween. Moreover, since the second attachment surface 124 is arranged using the above-described space 170, a second portion 180 of the bottom surface 130 of the cover 108, the second portion 180 overlapping the chassis 116 in the vehicle upper-lower direction, can be formed so as to be located at a higher level in the vehicle than the first portion 178 by a dimension Lb as shown in FIG. 6B.

As described above, in the present embodiment, in a state in which the bracket 110 is attached to the ceiling surface 112 with the cover 108 hanging from the bracket 110, the vertical wall 126 is spaced apart from the in-vehicle device 106 toward the vehicle rear side, and the second attachment surface 124 is spaced apart from the chassis 116 of the in-vehicle device 106 when viewed from the vehicle lateral side. Thus, with the in-vehicle device covering structure 100, if a load from the vehicle rear side or the vehicle lower side is applied to the cover 108, the load is received by the vertical wall 126 or the second attachment surface 124 of the bracket 110 and transferred to the ceiling surface 112 via the first attachment surface 122 having high rigidity. Therefore, with the in-vehicle device covering structure 100, even if a load from the vehicle rear side or the vehicle lower side is applied to the cover 108, the load is not directly transferred to the in-vehicle device 106, and the in-vehicle device 106 can be protected. It should be noted that since the bracket 110 is made of a metal and receives the load, the cover 108 itself does not need to be formed of an expensive material having high shock resistance.

Moreover, the second attachment surface 124 of the bracket 110 is arranged at a distance from the chassis 116 using the above-described space 170. Therefore, with the in-vehicle device covering structure 100, while the first portion 178 of the cover 108 is located directly under the camera unit 114, the second portion 180 of the cover 108 can be located on the vehicle upper side relative to the first portion 178, and thus the vehicle interior space is not reduced.

Moreover, the width dimension Wa of the second attachment surface 124 of the bracket 110 in the vehicle width direction is shorter than the width dimension Wb of the chassis 116 in the vehicle width direction, and furthermore, the second attachment surface 124 fits within the width of the in-vehicle device 106 in the vehicle width direction. Therefore, with the in-vehicle device covering structure 100, the size of the cover 108 is reduced, and thus the vehicle interior space is not reduced.

Furthermore, the cover 108 is attached to not only the second attachment surface 124 of the bracket 110 but also the first attachment surface 122, which is attached to the ceiling surface 112 of the vehicle interior and has high rigidity. Moreover, the first attachment surface 122 is attached to the ceiling surface 112 at a position on the vehicle rear side relative to the in-vehicle device 106, and thus can receive a load applied to the cover 108 from the vehicle rear side. Therefore, with the in-vehicle device covering structure 100, even if a load from not only the vehicle lower side but also the vehicle rear side is applied to the cover 108, the bracket 110 is unlikely to bend, and thus the in-vehicle device 106 can be protected even more.

While a preferred embodiment of the present invention has been described above with reference to the accompanying drawings, it should be appreciated that the present invention is not limited to the embodiment shown above. It will be apparent for a person skilled in the art that various modifications and variations may be made within the scope of the invention as defined in the appended claims, and those modifications and variations should be understood to be included within the technical scope of the present invention.

The present invention can be used for an in-vehicle device covering structure with which an in-vehicle device attached to a ceiling surface of a vehicle interior near a windshield glass of a vehicle is covered from below.

The invention claimed is:

1. An in-vehicle device covering structure comprising:
    an in-vehicle device attached to a ceiling surface of a vehicle interior near a windshield glass of a vehicle;
    a cover that covers the in-vehicle device from below; and
    a plate-shaped bracket attached to the ceiling surface and covered by the cover from below together with the in-vehicle device, the cover hanging from the bracket, wherein the bracket has:
        a first attachment surface attached to the ceiling surface on a vehicle rear side relative to the in-vehicle device;
        a second attachment surface attached to the cover, the second attachment surface being arranged overlapping at least a portion of the in-vehicle device when viewed in a vehicle upper-lower direction and at a distance from the in-vehicle device; and
        a vertical wall connecting the first attachment surface and the second attachment surface, the vertical wall being arranged on the vehicle rear side relative to the in-vehicle device and at a distance from the in-vehicle device.

2. The in-vehicle device covering structure according to claim 1, wherein:
    a rear portion of the in-vehicle device is recessed upward and forms a space, and
    the second attachment surface of the bracket overlaps the space when viewed from a vehicle lateral side.

3. The in-vehicle device covering structure according to claim 2, wherein both ends of the second attachment surface of the bracket in a vehicle width direction are located inward, with respect to the vehicle width direction, of both ends of the in-vehicle device in the vehicle width direction.

4. The in-vehicle device covering structure according to claim 3, wherein the cover is attached to the first attachment surface of the bracket.

5. The in-vehicle device covering structure according to claim 2, wherein the cover is attached to the first attachment surface of the bracket.

6. The in-vehicle device covering structure according to claim 1, wherein both ends of the second attachment surface of the bracket in a vehicle width direction are located inward, with respect to the vehicle width direction, of both ends of the in-vehicle device in the vehicle width direction.

7. The in-vehicle device covering structure according to claim 6, wherein the cover is attached to the first attachment surface of the bracket.

8. The in-vehicle device covering structure according to claim 1, wherein the cover is attached to the first attachment surface of the bracket.

* * * * *